United States Patent [19]

Natarajan et al.

[11] Patent Number: 5,041,493
[45] Date of Patent: Aug. 20, 1991

[54] MOLDABLE POLYBLENDS

[75] Inventors: Kavilipalayam M. Natarajan, North Brunswick; Robert Mininni, Skillman, both of N.J.

[73] Assignee: Enichem Americas, Inc., Monmouth Junction, N.J.

[21] Appl. No.: 437,538

[22] Filed: Nov. 16, 1989

[51] Int. Cl.$^5$ ................. C08L 69/00; C08L 67/02
[52] U.S. Cl. ..................................... 524/505; 524/508; 525/92; 525/133; 525/146; 525/148; 525/411; 525/413; 525/415
[58] Field of Search ............... 525/92, 133, 146, 148, 525/411, 413, 415; 524/505, 508

[56] References Cited

U.S. PATENT DOCUMENTS 3,835,089 9/1974 Fox ........................................ 525/411
4,388,443 8/1983 Bourland ............................ 525/148
4,786,692 11/1988 Allen ..................................... 525/92

Primary Examiner—John C. Bleutge
Assistant Examiner—David Buttner
Attorney, Agent, or Firm—Lerner, David, Littenberg, Krumholz & Mentlik

[57] ABSTRACT

A moldable polyblend of an aromatic polycarbonate, a polyester of an aromatic dicarboxylic acid, an elastomeric rubber, and a polylactone, which polylactone is present within the range of from about 1.0 to about 10 weight % of the polyblend.

22 Claims, No Drawings

MOLDABLE POLYBLENDS

BACKGROUND OF THE INVENTION

The present invention relates to thermoplastic molding compositions based on a resinous polyblend to which a polylactone has been added to improve surface gloss, and in particular to aromatic polycarbonate based polyblends to which poly(epsilon-caprolactone) has been added to improve surface gloss.

Aromatic polycarbonates are a widely used class of thermoplastic molding polymers selected for superior molding properties. However, molded aromatic polycarbonate articles lack critical thickness impact strength and chemical resistance. This has been overcome by forming polyblends of polycarbonates with thermoplastic poly(alkylene terephthalates) and elastomeric rubber polymers. Articles molded from such polyblends lack surface gloss, a necessary feature the absence of which makes the polyblends unsuitable for many end use applications.

Polylactones have been shown to be useful property modifiers for resinous thermoplastic molding compositions. U.S. Pat. No. 4,492,782 discloses that polycaprolactone improves the impact strength and dimensional stability of polyester molding compositions. U.S. Pat. No. 4,536,531 discloses that polycaprolactone improves the crystallization rate of polyester molding compositions. U.S. Pat. No. 4,656,206 discloses that polycaprolactone improves the impact strength of polyester molding compositions.

U.S. Pat. No. 4,064,195 discloses that polycaprolactone improves the stress crack resistance of aromatic polycarbonate molding compositions. U.S. Pat. No. 4,388,443 discloses that polylactones compatiblize molding composition blends of aromatic polycarbonate and rubber-modified styrene maleic anhydride.

It has now been discovered that polylactones, when added to a thermoplastic molding composition prepared from a resinous polyblend of an aromatic polycarbonate with a poly(alkylene terephthalate) polyester and an elastomeric rubber improves the surface gloss of articles molded therefrom. The surface gloss of articles molded from the polylactone containing molding compositions is improved without a loss of physical properties important to the end use applications of the articles.

SUMMARY OF THE INVENTION

According to the present invention, there is provided a thermoplastic composition prepared from a resinous polyblend of an aromatic polycarbonate with a polyester of an aromatic dicarboxylic acid, an elastomeric rubber, and a polylactone, wherein the polylactone is present within the range of from about 1.0 to about 10 weight % of the resinous blend.

The addition of polylactone significantly improves the surface gloss of articles molded from the resinous blend. The polylactone addition does not adversely affect physical properties of the articles such as impact strength, surface hardness, tensile strength or elongation. The physical properties and surface gloss are measured according to ASTM test procedures, including procedures set forth in ASTM-D638 for tensile strength and elongation, ASTM-D256 for impact strength, ASTM-D785 for surface hardness and ASTM-D523 for surface gloss.

Also, according to the present invention there is provided a method or producing a molded polyblend by forming a polyblend of an aromatic polycarbonate with a polyester of an aromatic dicarboxylic acid, elastomeric rubber, and a polylactone present in an amount within the range of from about 1.0 to about 10 weight % of the polyblend, and then molding the formed polyblend.

DETAILED DESCRIPTION OF THE PREFERRED EMBODIMENT

The resinous thermoplastic molding compositions of the present invention are based upon an aromatic polycarbonate. Any aromatic polycarbonates suitable for use in thermoplastic molding compositions can be employed in the polyblends of this invention. The useful aromatic polycarbonate resins may include homopolycarbonate, copolycarbonate and terpolycarbonate resins or mixtures thereof. The polycarbonate resins may be prepared by the known polycondensation of phosgene and aromatic dihydroxy compounds as taught by H. Schnell, *Chemistry and Physics of Polycarbonates* (Interscience Publishers, New York 1964), the teachings of which are incorporated herein by reference thereto.

Such suitable polycarbonates are typically manufactured from aromatic dihydroxy compounds such as resorcinol, hydroquinone, dihydroxydiphenyls, bis(hydroxyphenyl)-derivatives and the like. Among the bis-(hydroxyphenyl)-derivatives useful in the practice of the invention are bis-(hydroxyphenyl)-alkanes, -cycloalkanes, -ethers, -ketones, -sulfoxides, -sulfones and alpha, alpha-bis-(hydroxyphenyl)-diisopropylbenzenes. These and further suitable polycarbonates are taught by U.S. Pat. Nos. 3,028,365, 2,999,835, 3,148,172, 3,271,368, 2,991,273, 3,271,367, 3,280,078, 3,014,891 and 2,999,846; German Published Specification Nos. 1,570,703, 2,063,050, 2,063,052, 2,211,956 and 2,111,957; French Published Specification No. 1,561,418 and in Schnell, *Chemistry and Physics of Polycarbonates,* the teachings of all of which are incorporated herein by reference thereto.

The most preferred aromatic polycarbonates for use in the polyblend compositions hereof include bis(hydroxyphenyl)-derivatives, including 2,2-bis-(4-hydroxyphenyl)-propane (i.e., Bisphenol A), 2,4-bis-(4-hydroxyphenyl)-2-methylbutane, 1,1-bis-(4-hydroxyphenyl)-cyclohexane, alpha, alpha-bis-(4-hydroxyphenyl)-p-diisopropylbenzene, 2,2-bis-(3-chloro-4-hydroxyphenyl)-propane, hydroxybenzophenone, 4,4'-sulfonyldiphenyl, and 2,2-bis(2,3,5,6-tetramethyl-4-hydroxyphenyl) propane (i.e., Tetramethyl Bisphenol A). The most preferred bis-(hydroxyphenyl)-derivatives are Bisphenol A and Tetramethyl Bisphenol A.

The polycarbonates of the invention may contain units derived from one or more of the suitable bis-(hydroxyphenyl)-derivatives. The polycarbonates useful to the invention may be prepared by any of the processes known in the art, such as by interfacial polycondensation, polycondensation in a homogeneous phase or by transesterification. The suitable processes and associated reactants, catalysts and solvents are known in the art and have been taught in the above polycarbonate patents, as well as in U.S. Pat. Nos. 3,248,414, 3,153,008, 3,215,668, 3,187,065, 2,964,974, and 1,991,273; and German Patent Nos. 1,046,311 and 962,274, the teachings of all of which are incorporated herein by reference thereto.

Also useful in the practice of the invention are branched polycarbonates derived from aromatic phenolic compounds with three or more hydroxyl groups, as taught in published German Specification Nos. 1,595,762, 2,116,974 and 2,113,347, published British Specification No. 1,079,821 and U.S. Pat. No. 3,544,514, the teachings of all of which are incorporated herein by reference thereto. Examples of phenolic compounds with three or more hydroxyl groups are disclosed in U.S. Pat. No. 4,554,314, the disclosure of which is incorporated herein by reference thereto.

Phenolphthalein based polycarbonate, copolycarbonate and terpolycarbonate resins are also suitable in the practice of the invention, and are described in U.S. Pat. Nos. 3,036,036 and 4,210,714, both of which are incorporated herein by references thereto.

The polycarbonate resins useful in the practice of the invention have weight average molecular weights of at least about 15,000 and generally between about 20,000 and about 60,000 and preferably have weight average molecular weights between about 25,000 and about 50,000. The polycarbonate resins are additionally characterized by a melt flow of between about 5.0 and about 17.0 g/10min. at 280° determined by ASTM D-1238.

The polyblend can contain from about 5 to about 95 weight % polycarbonate. Preferably, the polyblend will contain from about 10 to about 90 weight % polycarbonate.

The polyesters of aromatic dicarboxylic acids useful in the practice of the invention may be any such polyester suitable for use in thermoplastic molding compositions. The polyesters are typically derived from a dicarboxylic acid and a diol component. The dicarboxylic acid component of the polyester should contain at least 20 % but not limited to aromatic dicarboxylic acids selected from terephthalic acid, isopthalic acid, napthalene dicarboxylic acid, diphenyletherdicarboxylic acid, diphenyldicarboxylic acid, diphenylsulfonedicarboxylic acid, diphenoxyethane dicarboxylic acid and the like. The dicarboxylic acid component of the polyester may optionally contain up to 80 % of but is limited to aliphatic dicarboxylic acids selected from succinic acid, adipic acid, sebacic acid and the like.

The diol component of the polyesters may be selected from aliphatic and alicyclic diols containing from 2 to 10 carbon atoms such as ethylene glycol, diethylene glycol, trimethylene glycol, tetramethylene glycol, 1,4-cyclohexanediol and the like. The diol component may contain up to 100% of aromatic diols such as hydroquinone, dihydroxynaphthalene, and the like.

The preferred polyesters are poly(alkylene terephthalates) characterized in that the structure comprises units of the general formula:

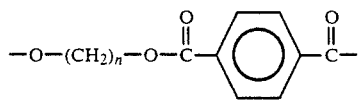

wherein n is an integer between 2 and 6. The most preferred poly(alkylene terephthalates) are poly (ethylene terephthalate) and poly(butylene terephthalate).

Suitable polyesters of aromatic dicarboxylic acids are further characterized as having intrinsic viscosities between about 0.4 and about 1.2 g/deciliter and preferably between about 0.6 and about 0.8. Intrinsic viscosity is obtained by extrapolation of viscosity values to zero concentration of solutions of PET in a 60/40 volume ratio of phenol/tetrachloroethanel at 25° C. Such polyesters are taught by U.S. Patent No. 2,465,319 and may be derived by the preparation methods disclosed by this patent and U.S. Pat. No. 3,047,539, both of which are incorporated herein by reference thereto.

The polyblend can contain from about 3 to about 90 weight % of polyesters of aromatic dicarboxylic acids. Preferably, the polyblend will contain from about 5 to about 50 weight % of polyesters of aromatic dicarboxylic acids.

The polyblends of the invention also include one or more elastomeric rubbers, which may be any elastomeric rubber suitable for use in thermoplastic molding compositions.

Examples of suitable elastomeric rubbers include essentially non-crystalline, saturated or unsaturated rubber copolymers of two or more alpha monoolefins, preferably copolymerized with at least one polyene, usually a diene. Saturated monoolefin copolymer rubber, commonly called EPM rubber, can also be used, such as copolymers of ethylene and propylene.

Of the unsaturated monoolefin copolymer rubber, commonly called EPDM rubber, satisfactory examples include products from the polymerization of monomers of two alpha monoolefins, usually ethylene and propylene, and a lesser quantity of non-conjugated diene. Suitable alpha monoolefins are illustrated by the formula $CH_2=CHR$ wherein R is hydrogen or an alkyl of 1 to 8 carbon atoms, such as ethylene, propylene, 1-butene, 1-pentene, 1-hexene, 2-methyl 1-propene, 3-methyl-1-pentene, 4-methyl-1-pentene, 3-dimethyl-1-butene, 2,4,4-trimethyl-1-pentene, 5-methyl-1-hexene, 1,4-ethyl-1-hexene and the like.

Satisfactory non-conjugated dienes include straight chain dienes such as 1,4-hexadiene, cyclic dienes such as cyclooctadiene and bridged cyclic dienes such as ethylidenenorborene.

Other suitable elastomeric rubber compounds include acrylate interpolymers, and random and block copolymers of styrene, acrylonitrile, butadiene and/or isoprene such as Shell's Kraton D's and also their hydrogenated versions to ethylene-butylene and/or ethylene-propylene such as Shell Kraton G's.

Suitable elastomeric rubbers are further characterized as having Mooney Viscosities (MV) between about 30 and about 100. The Mooney Viscosities are measured as per ASTM-D1646-74. Preferable MV for the elastomeric rubbers is between 30 to 50.

Preferably, the elastomeric rubber is a monoolefinic copolymer, even more preferably, the monoolefinic copolymer is unsaturated. Most preferably, the unsaturated monoolefinic copolymer is EPDM rubber.

The polyblend can contain from about 1 to about 90 weight % of elastomeric rubber. Preferably, the polyblend will contain from about 5 to about 20 weight % of elastomeric rubber.

The polylactone suitable for use in the invention can be any polylactone suitable for use in thermoplastic molding compositions. Preferred polylactones are characterized in that the structure comprises units of a general formula:

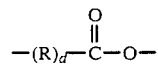

wherein R is an independently selected straight chained or branched alkyl radical having from 1 to 5 carbon atoms and d is an integer between 1 and about 6. More preferred polylactones include poly(beta-propiolactone), poly(gamma-butyrolactone), poly(delta-valerolactone) and poly(epsilon-caprolactone). The most preferred polylactone is poly(epsilon-caprolactone).

Poly(epsilon-caprolactones) suitable for use in the present invention are characterized by a number average molecular weight above 10,000 and preferably in the range of between about 20,000 and about 100,000. Even more preferred are poly(epsilon-caprolactones) having number average molecular weights between about 25,000 and about 50,000.

The polyblend can contain from about 1 to about 10 weight % of polylactone. Preferably, the polyblend will contain from about 1 to about 5 weight % of polylactone.

The polyblend of the invention is suitable to produce molded articles using conventional molding apparatus. As such, the polyblend can optionally contain in amounts from about 0 to about 50 weight % of the total formula weight of art-recognized additives such as pigments, fillers, stabilizers, fire retardants, lubricants, accelerators, vulcanizing agents, antidegradants, antioxidants, processing aids, adhesives, tackifiers, rubber plasticizers, prevulcanization inhibitors, discontinuous fibers such as wood or cellulose fibers, extender oils, mold release agents and nucleating agents.

The multiple polyblend of this invention can be prepared using any art-recognized method for blending polymers. For example, the polymers can be dry blended at room temperature followed by melt mixing at a temperature above the softening points of the polymers using any conventional melt mixing apparatus including extruders, calendars, kneaders and the like.

The polymers to be dry blended can be an initial blend of one or more of the polymers to which the polylactone is to be added, including commercially available polymer blends. For example, a polycarbonatepolyester, polycarbonate-rubber, polyester-rubber or polycarbonate-polyester-rubber blend may be used.

The following examples serve to provide further appreciation of the invention, but are not meant in any way to restrict the effective scope of the invention.

EXAMPLES

Examples 1-3

A blend of 90% Bisphenol A polycarbonate (PC), 5% polyethylene terephthalate (PET) and 5% EPDM rubber were blended at room temperature with Union Carbide P-700 poly(epsilon caprolactone) having a number average molecular weight of 40,000. The polycarbonate had a weight average molecular weight of 30,000 and a melt flow of about 10-12. The PET had an intrinsic viscosity of 0.62 g/deciliter measured in a 60/40 volume ratio of phenol to tetrachloroethanel at 25° C. The EPDM had an MV of 45-50. The blends were prepared according to the weight-percent formulations listed in Table I. The sample of Example 3 was prepared as a control.

TABLE I

| Example | 1 | 2 | 3 |
|---|---|---|---|
| PC/PET/EPDM | 95 | 98 | 100 |
| P-700 | 5 | 2 | 0 |

The PC/PET/EPDM blend was dried in a dehumidifying oven at 110° C. for 48 hours. Then the samples were removed and cooled in a dry environment and then dry-blended with the polycaprolactone. The samples were then extruded using a Haake Buchler system 90 extruder and pelletized. The melt temperature was 260° C.

The compounded pellets were dried again for 48 hours at 110° C. prior to injection molding. A hopper dryer was used on a Nissei 80 ton, 5 ounce injection molding machine to kept the samples dry prior to injection molding. Test specimens such as tensile bars, flexural bars and the discs were molded. The melt temperature was 260°-265° C. The injection pressure was 12,000 psi. The total cycle time for molding was 52 seconds.

The surface gloss of the samples were tested according to ASTM-D523, with measurements taken at 20°, 60° and 85° using a Glossmeter.

The results of the surface gloss testing of the samples are depicted in Table II.

TABLE II

| | Relative Reflectance (%) | | |
|---|---|---|---|
| Incident Angle | 1 | 2 | 3 |
| 20° | 90.3 | 84.1 | 64.7 |
| 60° | 98.6 | 97.5 | 95.0 |
| 85° | 96.4 | 95.8 | 95.0 |

The samples of Examples 1 and 2 containing 5% and 2% P-700 showed significantly improved surface gloss especially at low incidence angle over the control sample of Example 3, containing no P-700. The physical properties of the samples were also tested for tensile strength and elongation according to ASTM-D638, impact strength according to ASTM-D256 and surface hardness according to ASTM-D785. The test results are set out in Table III.

TABLE III

| Example | 1 | 2 | 3 |
|---|---|---|---|
| Tensile Strength (PSI) | 8700 | 8900 | 8700 |
| Elongation (%) | 160 | 200 | 190 |
| Notched IZOD (Ft.-lbs.) | 12.5 | 16.6 | 16.8 |
| Dynatup Impact (Ft.-lbs.) | 34 | 36 | 35 |

The physical properties of the samples containing P-700 did not differ significantly from the physical properties of the control sample, indicating that the surface gloss of the polymer blend can be improved by the addition of P-700 without sacrificing important physical performance properties.

As will be readily appreciated, numerous variations and combinations of the features set forth above can be utilized without departing from the present invention as set forth in the claims. Such variations are not regarded as a departure from the spirit and scope of the invention, and all such modifications are intended to be included within the scope of the following claims.

I claim:

1. A composition of matter comprising a polyblend of an aromatic polycarbonate having a weight average molecular weight between about 15,000 and about 60,000, a polyester of an aromatic dicarboxylic acid, an elastomeric rubber and a polylactone, wherein said polylactone is present with the range of from about 1.0 to about 10.0 weight % of the polyblend.

2. The composition of claim 1, wherein said polylactone is present with the range of from about 1 to about 5 weight % of the polyblend.

3. The composition of claim 1, wherein said polylactone is characterized by the formula

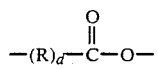

wherein R is a straight chained or branched alkyl radical having from 1 to 5 carbon atoms and d is an integer between about 1 and about 7.

4. The composition of claim 3, wherein said polylactone is selected from the group consisting of poly(beta-propiolactone), poly(gamma-butyrolactone), poly(delta-valerolactone) and poly(epsiloncaprolactone).

5. The composition of claim 4, wherein said polylactone is poly(epsilon-caprolactone).

6. The composition of claim 1, wherein said aromatic polycarbonate is present within the range of from about 5 to about 95 weight % of the polyblend.

7. The composition of claim 1, wherein said aromatic polycarbonate is a product of the polycondensation of phosgene and an aromatic dihydroxy compound selected from the group consisting of resorcinol, hydroquinone, dihydroxydiphenyls and bis(hydroxyphenyl)-derivatives.

8. The composition of claim 7, wherein said bis-(hydroxyphenyl)-derivative compounds are selected from the group consisting of bis-(hydroxyphenyl)-alkanes, bis-(hydroxyphenyl)-cycloalkanes, bis-(hydroxyphenyl)-esthers, bis-(hydroxyphenyl)-ketones, bis(hydroxyphenyl)-sulfoxides, bis-(hydroxyphenyl)sulfones, and alpha, alpha-bis-(hydroxyphenyldiisopropyl-benzenes.

9. The composition of claim 8, wherein said bis-(hydroxyphenyl)-alkane is selected from the group consisting of Bisphenol A and Tetramethyl Bisphenol A.

10. The composition of claim 1, wherein said polyester of an aromatic dicarboxylic acid is present within the range of from about 3 to about 90 weight % of the polyblend.

11. The composition of claim 10, wherein said aromatic dicarboxylic acid polyester is present within the range of from about 5 to about 50 weight % of the polyblend.

12. The composition of claim 1, wherein said polyester of an aromatic dicarboxylic acid is a poly(alkylene terephthalate) comprising repeating units given by the formula:

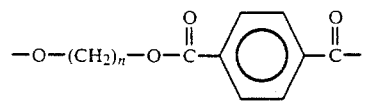

wherein n is an integer between two and six.

13. The composition of claim 12, wherein said poly(alkylene terephthalate) is selected from the group consisting of poly(ethylene terephthalate) and poly (butylene terephthalate).

14. The composition of claim 1, wherein said elastomeric rubber is present within the range of from about 1 to about 90 weight % of the polyblend.

15. The composition of claim 14, wherein said elastomeric rubber is present within the range of from about 5 to about 20 weight % of the polyblend.

16. The composition of claim 1, wherein said elastomeric rubber is selected from the group consisting of saturated copolymers of two or more alpha monoolefins, unsaturated copolymers of two or more alpha monoolefins with a diene, acrylate interpolymers, and random and block copolymers of two or more monomers selected from the group consisting of styrene, acrylonitrile, butadiene and isoprene.

17. The composition of claim 16, wherein said copolymer is a selectively hydrogenated block copolymer of styrene and butadiene.

18. The compositon of claim 16, wherein said elastomeric rubber is an unsaturated copolymer of two or more alpha monoolefins with a diene.

19. The compositon of claim 18, wherein said unsaturated copolymer of two or more alpha monoolefins with a diene is EPDM rubber.

20. The composition of claim 1, further comprising from about 0 to about 50 weight % of one or more additives selected from the group consisting of pigments, fillers, stabilizers, fire retardants, lubricants, accelerators, vulcanizing agents, antidegradants, antioxidants, processing aids, adhesives, tackifiers, rubber plasticizers, prevulcanization inhibitors, discontinuous fibers, extender oils, mold release agents and nucleating agents.

21. A method of producing a molded polyblend which comprises:
(a) forming a polyblend comprising an aromatic polycarbonate having a weight average molecular weight between about 15,000 and about 60,000; a polyester of an aromatic dicarboxylic acid; and elastomeric rubber and a polylactone, wherein said polylactone is present within the range of from about 1.0 to about 10 weight % of the polyblend; and
(b) molding the polyblend.

22. A molded polyblend produced according to the method of claim 21.

* * * * *

UNITED STATES PATENT AND TRADEMARK OFFICE
CERTIFICATE OF CORRECTION

PATENT NO. : 5,041,493
DATED : August 20, 1991
INVENTOR(S) : Natarajan et al.

It is certified that error appears in the above-identified patent and that said Letters Patent is hereby corrected as shown below:

Column 2, line 25, "bis(hy-" should read --bis-(hy- --.

Column 2, line 41, "bis(hy-" should read --bis-(hy- --.

Column 3, line 3, "1,595,762" should read --1,596,762--.

Column 3, line 13, "4,210,714" should read --4,210,741--.

Column 3, line 59; "poly (ethyl-" should read --poly(ethyl- --.

Column 5, lines 38-39, "polycarbonatepolyester" should read --polycarbonate-polyester--.

Column 6, line 9, "kept" should read --keep--.

Column 6, line 64, "present with" should read --present within--.

Column 6, line 67, "present with" should read --present within--.

Column 7, claim 4, line 4, "poly(epsiloncaprolactone)" should read --poly(epsilon-caprolactone)--.

Column 7, claim 7, line 5, "bis(hydroxyphenyl)-" should read --bis-(hydroxyphenyl)- --.

Column 7, claim 8, line 5, "phenyl)-esthers," should read --phenyl)-ethers,--.

UNITED STATES PATENT AND TRADEMARK OFFICE
CERTIFICATE OF CORRECTION

PATENT NO. : 5,041,493

DATED : August 20, 1991

INVENTOR(S) : Natarajan et al.

It is certified that error appears in the above-identified patent and that said Letters Patent is hereby corrected as shown below:

Column 7, claim 8, line 5, "bis(hy-" should read --bis-(hy- --.

Column 7, claim 8, line 6, "bis-(hydroxyphenyl)sulfones" should read --bis-(hydroxyphenyl)-sulfones--.

Column 7, claim 8, lines 7-8, "alpha-bis-(hydroxyphenyldiisopropyl-ben-zenes." should read --alpha-bis-(hydroxyphenyl)-diisopropyl-benzenes.--.

Column 8, claim 18, line 1, "compositon" should read --composition--.

Column 8, claim 19, line 1, "compositon" should read --composition--.

Signed and Sealed this

Ninth Day of March, 1993

Attest:

STEPHEN G. KUNIN

Attesting Officer

Acting Commissioner of Patents and Trademarks